Figures 1, 2:
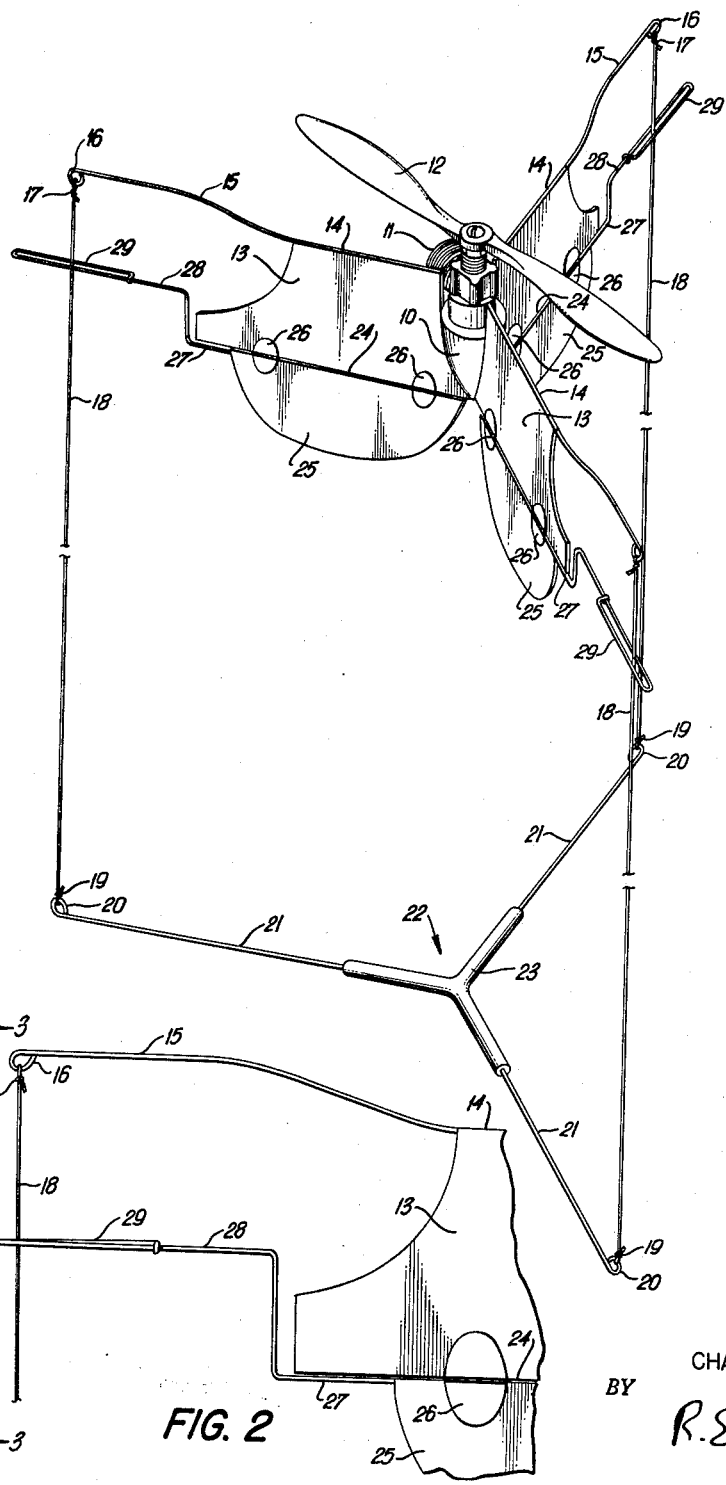

INVENTOR.
CHARLES A. LINDLEY
BY
R. E. Geangue
ATTORNEY

July 16, 1963
C. A. LINDLEY
3,097,445
THRUST-SUPPORTED AND THRUST-CONTROLLED DEVICE
Filed Dec. 7, 1959
2 Sheets-Sheet 2
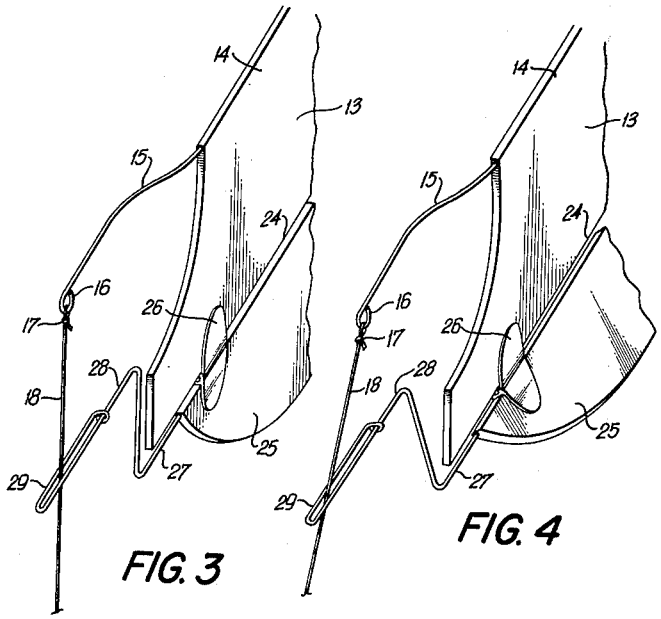
FIG. 3
FIG. 4
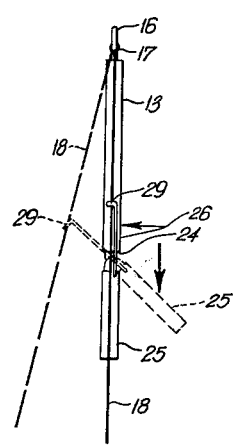
FIG. 5
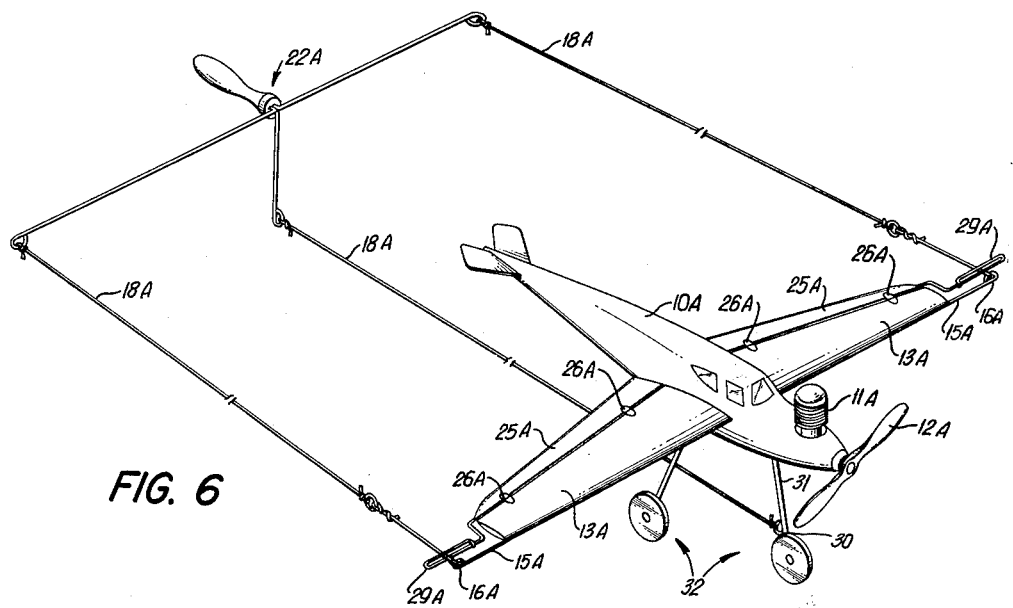
FIG. 6
INVENTOR.
CHARLES A. LINDLEY
BY
R. E. Geangue
ATTORNEY.

United States Patent Office 3,097,445
Patented July 16, 1963

3,097,445
THRUST-SUPPORTED AND THRUST-
CONTROLLED DEVICE
Charles A. Lindley, Los Angeles, Calif.
(4741 Natoma Ave., Woodland Hills, Calif.)
Filed Dec. 7, 1959, Ser. No. 857,633
14 Claims. (Cl. 46—77)

The present invention relates to a thrust-supported and thrust-controlled device, and in one aspect relates, more particularly, to a thrust-supported and thrust-controlled model airplane.

The airplane includes a fuselage body member provided with thrust-producing engine means and, usually, air coupling means such as a propeller, or the like, although not specifically so limited, providing forwardly directed thrust and generally rearwardly directed slipstream, with the fuselage body member being preferably, though not necessarily, provided with wing or airfoil means, and with the device being remotely connected by a plurality of flexible longitudinal tensile and/or torsional members to control handle means adapted to be manually carried by an operator standing on the ground, the operator will thus be able to effectively cause the model airplane to be supported by the thrust provided by the propeller, ducted fan, rocket, or the like, in any selected position or orientation, which is completely controllable by the operator on the ground by appropriate movement of the control handle means. In other words, the model airplane of the present invention is not intended to actually fly aerodynamically with respect to the operator controlling it from the ground, but instead it is thrust-supported and thrust-controlled so that it can assume any desired position or orientation selected by the operator on the ground. Also, the appearance of aerodynamic flight will result if the operator moves so as to permit the model airplane to move.

A major feature of the present invention is the extreme ease with which the ground-based operator can control the position of the thrust-supported and thrust-controlled airplane at will. This embodies two types of control: (1) control of the vertical and horizontal position of the model; and (2) control of, and the maintenance of a stable angular relationship of, the model with respect to the control handle means in the operator's hand. The first above-mentioned type of control—that is, vertical and horizontal positional control of the model—is achieved by appropriate controllable deflection of the propeller slipstream. This may be accomplished by tilting the entire model, its engine, and/or appropriately deflecting control vanes or flaps in the propeller slipstream. The second above-mentioned type of control—that is, angular positional control of the model whereby to maintain a stable angular relationship of the model with respect to the control handle means in the operator's hand despite the tendency of propeller torque and other extraneous forces to rotate the model about an axis nearly parallel to the flexible longitudinal tensile and/or torsional control lines interconnecting the model and the control handle means— may be achieved by direct transmission of torque from the control handle means through the flexible longitudinal control lines to the model or by effective torque amplifying means interposed between the connections of the flexible longitudinal tensile control lines to the control handle means and the connections of the other ends thereof to the model whereby to effectively cause torque to be applied to the model in an effective manner. In one preferred form, this may be accomplished by effective torque-amplifying devices comprising control vanes or flaps pivotally carried by the wing or airfoil means of the model and engaged with the flexible longitudinal control lines between the connections of remote ends thereof to the model airplane and connections of the other ends thereof to the control handle means, said engagement being such that angular roll of the model about a longitudinal roll axis in either direction causes automatic pivotal movement of said control vanes or flaps in a manner applying an oppositely directed corrective torque tending to reverse-roll the model about the longitudinal roll axis back to its original angular orientation selected by the operator on the ground.

Prior art model airplanes have been invented and developed heretofore but most such prior art model airplanes known are of the type which fly in a large circle around the operator positioned on the ground and require a special flying area, such as a park, playground, or large field where no obstructions may be hit by the rapidly circularly moving wire interconnecting the model and the operator standing at the center of the circular path along which the model flies. Thus this type of prior art model is not adapted for use in areas having trees, telephone poles, or various other obstructions and having a relatively small amount of clear free unobstructed air space, as is true of the novel thrust-supported and thrust-controlled model airplane, of the present invention which may be caused to effectively hover or maintain a selected relatively non-moving position with respect to the ground-based operator so that it may be flown in a safe manner in areas where the above-mentioned prior art type of model airplane could not be flown safely. It is by virtue of this important difference of the present invention that it becomes a novel toy adapted for general usage by children almost anywhere. Furthermore, no prior model airplane has had a self-correcting control feature of the type embodied in the present invention as described in detail hereinabove whereby preselected positional control of the airplane is automatically achieved.

One specific and exemplary, but not limiting, model airplane form of the present invention may be said to comprise a fuselage body member having thrust-producing engine means and air, such as a propeller, coupling means for coupling the engine to ambient air whereby to provide thrust and rearwardly directed slipstream for supporting and controlling the model airplane, said fuselage body member being additionally provided with wing or airfoil means and control vane or flap means pivotally mounted with respect thereto, with a plurality of flexible longitudinal tensile members or control lines having remote ends fastened to the model airplane and having opposite ends fastened to control handle means adapted to be carried by a ground-based operator for the operation, positioning, and controlled orientation of the model airplane in the air when the engine is running and rotating the propeller, with intermediate portions of said flexible longitudinal tensile members or control lines engaging the individual flap means offset from the pivotal connections thereof with respect to the wing or airfoil means in a manner such as to cause corrective movement of said flaps applying a corrective torque to the model airplane about a longitudinal roll axis whenever the position of the control handle means and the model airplane become relatively angularly offset, such as by rotation of the hand of the operator holding the control handle means or rolling movement of the model airplane about its longitudinal roll axis.

It should be noted that, in one specific form of the present invention the connection of the remote ends of the flexible longitudinal tensile members or control lines to the model airplane may take the form of projecting member means carried by the leading edge or leading edges of the wing or airfoil means and outwardly projecting therefrom and each having at its outer end a connection member to which the remote end of the corresponding flexible tensile member or control wire is connected.

It should also be noted that, in one specific form of the present invention, the engagement of each of the flexible longitudinal tensile members or control wires with respect to the corresponding individual control vane or flap means may be accomplished by means of an outwardly projecting engaging element carried by the corresponding control vane or flap means offset from the pivotal mounting of said control vane or flap means behind the wing or airfoil member and extending into a position forwardly of said pivotal mounting location where it engages an intermediate portion of the corresponding flexible longitudinal tensile member or control wire.

It should be noted that, in one specific form of the present invention, the wing or airfoil means may comprise three airfoil or wing members located substantially 120 degrees from one another around the longitudinal roll axis of the fuselage body, and the individual control vane or flap means may also be three in number pivotally mounted behind each airfoil member and each having an outwardly projecting element connected thereto along the pivotal mounting location thereof and extending forwardly of the pivotal mounting location for engagement with a corresponding one of the flexible longitudinal tensile members or control wires, which in this case will be three in number.

It should be noted that, in another specific form of the present invention, the wing or airfoil means may take the form of two oppositely directed wing members positioned on opposite sides of the fuselage body and each having pivotally located therebehind a corresponding control vane or flap, each having connected along the pivotal mounting location thereof an outwardly projecting element which extends forwardly of the pivotal mounting location for engagement with a corresponding one of two of the three flexible longitudinal tensile members or control wires, thus leaving a third flexible longitudinal tensile member or control wire, which may be connected to a third connection member positioned at a location transversely offset from the fuselage body member and offset from a line interconnecting the other two connection members. In one specific form, this third connection member may actually comprise a portion of a downwardly projecting landing gear means carried by the fuselage body member.

From the above description of several preferred exemplary forms of the present invention, it will be apparent to those skilled in the art that the hereinbefore-mentioned prior art space and location problems involved in the use of prior art model airplanes are substantially entirely eliminated, met, and/or overcome in and through the use of the thrust-controlled and thrust-supported model airplane of the present invention.

For example, it is obvious that the model airplane of the present invention can be flown and caused to maintain a substantially static position with respect to the ground-based operator wherever even a small amount of air space is available.

It is therefore an object of the present invention to provide a thrust-supported and thrust-controlled model airplane (or other device) which embodies novel control means for causing the airplane (or device) to shift its vertical or horizontal position in accordance with tilting movements of control handle means carried in the hand of a ground-based operator, and for causing the airplane (or device) to change its angular position about its longitudinal roll axis in accordance with corresponding angular movement of the control handle means in the hand of the ground-based operator. In other words, pitch, yaw, and roll of the model airplane (or device) are all completely under the control of the ground-based operator by merely correspondingly moving the control handle means when pitching, yawing, or rolling movement of the model airplane is desired.

It is a further object to provide a model airplane (or device) of the type referred to above, which embodies novel self-correcting control features whereby undesired movement of the model airplane (or device) causes self-correcting operation of control vanes or flaps to bring about a corrective repositioning of the model airplane (or device) into the selected position or orientation with respect to the ground-based operator.

It is a further object to provide a novel thrust-controlled and thrust-supported airplane (or device) of the character referred to in any of the preceding objects, which is of exceedingly simple, cheap, foolproof, easy-to-operate construction, such as to facilitate widespread use thereof as a toy, as an advertising device, as a temporary support for a radio antenna, or wherever what may be termed a "sky hook" may be required.

Other and allied objects will be apparent to those skilled in the art after a careful perusal, examination, and study of the accompanying illustrations, the present specification, and the appended claims.

To facilitate understanding, reference will be made to the hereinbelow-described figures, in which:

FIGURE 1 is a perspective view of one illustrative embodiment of the present invention with the three flexible longitudinal tensile members or control wires having central portions removed for drawing condensation purposes;

FIGURE 2 is an enlarged fragmentary plan view of the left end portion of the left wing or airfoil means shown in FIGURE 1 and illustrates the connection thereto of the remote end of one of the flexible longitudinal tensile control members or control wires and the intermediate engagement thereof with respect to the pivotally mounted control vane or flap in a manner such as to provide the novel control action of the present invention referred to hereinbefore;

FIGURE 3 is a fragmentary end perspective view of the left wing end and flap end of FIGURE 2, shown in this view in normal position;

FIGURE 4 is a view similar to FIGURE 3, but shows the apparatus after relative angular movement of the model airplane and the control handle means has occurred whereby to cause the control line, shown fragmentarily in FIGURE 4, to effectively pivot into a position such as to cause propeller slipstream passing thereover to apply effective torque to the wing whereby to cause it to move into substantially the same angular orientation as the control handle;

FIGURE 5 is an end elevational view of the apparatus of FIGURES 3 and 4 showing in solid lines the position of the apparatus as illustrated in FIGURE 3 and showing in broken lines the position of the apparatus as illustrated in FIGURE 4 and indicating, by the arrows, the corrective action of propeller slipstream thereon; and FIGURE 6 is a reduced-size perspective view similar to FIGURE 1 but illustrating a slightly modified form of model airplane having only two corrective individual control vanes or flaps and having the third control line connected to the landing gear at a location offset from the fuselage body and the wing whereby to provide a three-point control for the model airplane.

The form of the invention illustrated in FIGURES 1–5 comprises a fuselage body member 10, which may be made of low-density wood, plastic, or any other suitable material and which may be provided with thrust-producing engine means and air coupling means for coupling the engine to ambient air whereby to provide thrust and rearwardly directed slipstream for controllably supporting and controlling the airplane. In the specific example illustrated in FIGURES 1–5, the engine means takes the form of a small reciprocating type gasoline engine 11 and the air-coupling means takes the form of a propeller 12 driven by the gasoline engine 11 whereby to provide rearwardly directed slipstream passing along the length of the fuselage body member 10.

Also in the specific example illustrated in FIGURES

1–5, the fuselage body member 10 is provided with outwardly projecting wing or airfoil means, which are three in number and which are separated by 120 degrees from one another around a longitudinal roll axis passing longitudinally through the fuselage body member 10, each of said wings being indicated by the reference numeral 13 and each having a leading edge 14 provided with an outwardly directed wire projection member 15 having a connection loop member 16 at its outer end to which is fastened the remote connection end 17 of a corresponding one of three flexible longitudinal tensile members or control wires 18, each of which has its opposite fastening end 19 fastened to a corresponding fastening loop element 20 carried at the end of a corresponding one of three outwardly projecting arms 21 of control handle means, indicated generally at 22, with said three outwardly projecting arms 21 being spaced apart 120 degrees in a manner similar to the spacing of the wings 13 and being provided with a central Y-shaped manually graspable portion 23 adapted to be manually held so that the operator may move the control handle means 22 in any desired manner for the purpose of causing the airplane to correspondingly move and reposition itself.

In the specific example illustrated in FIGURES 1–5, each of the wings 13 has a trailing edge 24 to which a corresponding control vane or flap 25 is pivotally attached by pivotal mounting means or hinge means 26, with each of the control vanes or flaps 25 being provided with an outwardly projecting engaging element taking the form of a wire 27 having a forwardly offset portion 28 provided with an engaging loop member 29 at the outer end thereof encompassing and slidably engaging an intermediate portion of the corresponding control wire 18 in a manner whereby relative movement of the control handle 22 with respect to the model airplane, or of the model airplane with respect to the control handle 22, so as to cause each of the control wires 18 to move out of the normal co-planar position with respect to the corresponding wing 13, as shown in FIGURE 3, into a non-co-planar relationship, as best shown in FIGURE 4 in solid lines and in FIGURE 5 in broken lines, will effectively pivot the control vane or flap 25 from the normal co-planar position with respect to the corresponding wing 13 into the projecting position shown in solid lines in FIGURE 4 and in broken lines in FIGURE 5, whereby propeller slipstream passing over the projecting flap 25 and being applied thereto in the direction of the downwardly directed vertical arrow shown in FIGURE 5 will effectively apply a repositioning and corrective torque to the wing 13 such that it will move in the direction of the horizontal arrow shown in FIGURE 5 until it becomes co-planar with the control wire 18. FIGURES 3, 4, and 5 illustrate this control action in detail, it being understood that the normal position of the various elements is shown in solid lines in FIGURE 5 and the error position requiring corrective control is shown in broken lines in FIGURE 5.

It will readily be understood that pitching or yawing movement of the model airplane may be effected by merely correspondingly moving the control handle means 22 which effectively tilts the entire model airplane in the desired direction.

FIGURE 6 illustrates a slight modification of the invention, and similar parts are indicated by similar reference numerals, followed by the letter "A," however. In this modification, there are only two wings 13A and they are substantially oppositely directed on opposite sides of the fuselage body member 10A. Each of the wings 13A is provided with a flap 25A generally similar to the flaps 25 illustrated in the first form of the invention shown in FIGURES 1–5. However, the bottom control wire 18A shown in FIGURE 6 is connected directly to a connection portion 30 comprising a lower part of one of the struts 31 of landing gear means, indicated generally at 32, it being noted that the connection portion 30 is transversely offset from the wings 13A and from the fuselage body member 10A whereby to provide a three-position or three-point control generally similar to that described hereinbefore in connection with the first form of the invention illustrated in FIGURES 1–5. However, it should be noted that, in this modification, the control handle 22A is substantially T-shaped so as to position the control wires 18A in substantially the same configuration as the three connection portions 16A and 30, and further, it should be noted that the portion of each side control wire 18A immediately adjacent to the corresponding connection portion 16A includes a stiff wire portion adapted to provide a lever effect for effectively amplifying the control wire actuating force applied to the corresponding control vane or flap.

Numerous modifications and variations of the present invention will occur to those skilled in the art after a careful study hereof. All such properly within the basic spirit, scope and/or teachings of the present invention are intended to be included and comprehended herein as fully as if specifically described, illustrated, and claimed.

For example, one form of the present invention may eliminate the control vanes or flaps and the offset engaging projections carried thereby, and positional control of the model airplane may be effected in a pitching, yawing, and/or rolling manner by means of tension and/or torsion applied directly to the model airplane through the longitudinal control wires which, in certain forms, may be given a substantial degree of torsional stiffness.

It should be noted that the torque amplifying means effectively comprising the control vanes or flaps and offset engaging projections carried thereby illustrated in the figures and described hereinbefore may take other forms adapted to effectively amplify torque and apply same in a corrective manner to the model airplane (or other thrust-supported device). For example, pinion gear means and rack means, or other suitable coupling means effectively interconnecting longitudinal control wires and one or more control vanes or flaps similar to those illustrated in the figures, may be employed instead of employing the offset projecting wire-engaging means illustrated. In certain versions of this form of the invention only two flexible longitudinal control wires need be employed since they may be simultaneously operated through rack and pinion gear means coupling the control handle to the control ends of each of the tensile members which carry at the opposite ends similar pinion means cooperating with rack means connected to the flap means, whereby both flap means pivotally associated with the wing portions on each side of a model airplane may be similarly deflected either up or down whereby to bring about a repositioning of the model airplane or movement thereof about the pitch axis, thus eliminating the necessity for the third control wire shown in the second form of the present invention illustrated in the accompanying drawings as being connected to the landing gear. Additionally, various other effective torque amplifying means may be employed in lieu of the specific form illustrated and the modified form just described. This may be done within the basic spirit, scope, and teachings of the present invention.

It should also be noted that one or more of the longitudinal tensile members or an additional such longitudinal tensile member may be effectively coupled with respect to throttle means associated with the engine of the model airplane for actuation of the throttle either tensionally or torsionally.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present inven-

What is claimed is:

1. A thrust-supported and thrust-controlled device, comprising: a thrust-supportable object provided with thrust-producing engine means, said object being effectively provided with positioning and control means for positioning and retaining it in any desired stable thrust-supported position and for controlling its position and attitude, said positioning and control means including a manually engageable portion and elongated tension and torque transmission means between said manually engageable portion and the object extending substantially in the direction of thrust of the slip stream controlling the position of the object and adapted to effectively apply position correcting tension and torque to the object corresponding to and in response to relative movement of said manually engageable portion and said object.

2. A thrust-supported and thrust-controlled device, comprising: a thrust-supportable object provided with thrust-producing engine means, said object being effectively provided with positioning and control means for positioning and retaining it in any desired stable thrust-supported elevated position and for controlling its position and attitude with respect to a pitch axis, a yaw axis, and a roll axis perpendicular to one another, said positioning and control means including a manually operable handle portion at one end and tension and torque transmission means adapted to effectively apply position-correcting tension and effectively amplified torque to the object corresponding to and in response to relative movement of said manually operable handle portion and said object and including a plurality of longitudinal tensile members extending substantially parallel to the direction of thrust of the slip stream controlling the position of the object and effective torque amplifier means effectively connected between certain of said tensile members and said object adapted to effectively apply said position-correcting tension and effectively amplified torque to the object via modification of the resultant thrust produced by the engine means.

3. A thrust-supported and thrust-controlled device, comprising: a thrust-supportable object including a fuselage body member provided with a plurality of spaced outwardly projecting wing means and provided with thrust-producing engine means, and positioning and control means effectively connected to said object at multiple locations including two locations spaced on each side of a longitudinal roll axis of said object for positioning and retaining it in any desired stable thrust-supported elevated position and for controlling its position and its attitude with respect to a pitch axis, a yaw axis, and a roll axis perpendicular to one another, said positioning and control means including a manually engageable portion and tension and torque transmission means extending substantially parallel to said roll axis and adapted to effectively apply position-correcting tension and torque to the object corresponding to and in response to relative movement of said manually engageable portion and said object.

4. A thrust-supported and thrust-controlled device, comprising: a thrust-supportable object including a fuselage body member provided with a plurality of spaced outwardly projecting wing means and provided with thrust-producing engine means, and positioning and control means effectively connected to said object at multiple locations including two locations spaced on each side of a longitudinal roll axis of said object for positioning and retaining it in any desired stable thrust-supported elevated position and for controlling its position and its attitude with respect to a pitch axis, a yaw axis, and a roll axis perpendicular to one another, said positioning and control means including a manually operable handle portion at one end and tension and torque transmission means adapted to effectively apply position-correcting tension and effectively amplified torque to the object corresponding to and in response to relative movement of said manually operable handle portion and said object and including a plurality of flexible longitudinal solid tensile members and effective torque amplifier means effectively connected between the two of said tensile members connected to said two locations on said object adapted to effectively apply said position-correcting tension and effectively amplified torque to the object.

5. A thrust-supported and thrust-controlled device, comprising: a thrust-supportable object including a fuselage body member provided with a plurality of spaced outwardly projecting wing means and provided with thrust-producing engine means for solely supporting the object, and positioning and control means effectively connected to said object at multiple locations including two locations spaced on each side of a longitudinal roll axis of said object and a third location perpendicularly spaced therefrom for positioning and retaining it in any desired stable thrust-supported elevated position and for controlling its position and its attitude with respect to a pitch axis, a yaw axis, and a roll axis perpendicular to one another, said positioning and control means including a manually operable handle portion at one end and tension and torque transmission means adapted to effectively apply position-correcting tension and effectively amplified torque to the object corresponding to and in response to relative movement of said manually operable handle portion and said object and including three flexible longitudinal tensile members and two effective torque amplifier means effectively connected between the two of said tensile members connected to said two locations on said object adapted to effectively apply said position-correcting tension and effectively amplified torque to the object.

6. A thrust-supported and thrust-controlled device, comprising: a thrust-supportable object including a fuselage body member provided with a plurality of spaced outwardly projecting wing means symmetrically positioned around a longitudinal roll axis of the body member and provided with thrust-producing engine means for solely supporting the object, and positioning and control means effectively connected to said object at multiple locations including two locations on said wing means spaced on opposite sides of the longitudinal roll axis and a third location on said object perpendicularly spaced therefrom for positioning and retaining it in any desired stable thrust-supported elevated position and for controlling its position and its attitude with respect to a pitch axis, a yaw axis, and a roll axis perpendicular to one another, said positioning and control means including a manually operable handle portion at one end and tension and torque transmission means adapted to effectively apply position-correcting tension and effectively amplified torque to the object corresponding to and in response to relative movement of said manually operable handle portion and said object and including three flexible longitudinal solid tensile members and two effective torque amplifier means effectively connected between two of said tensile members connected to said wing means adapted to effectively apply said position-correcting tension and effectively amplified torque to the object.

7. A thrust-supported and thrust-controlled device of the character defined in claim 6, wherein each of said effective torque amplifier means comprises flap means pivotally mounted with respect to the corresponding wing means so as to normally lie in the same plane therewith for pivotal movement about a transverse axis substantially parallel to the pitch axis, and to the longitudinal direction of the wing means, and provided with an engaging element cooperable with a corresponding one of said flexible longitudinal tensile members for corrective pivotal actuation of said flap means in response to relative movement of the object around the longitudinal roll axis with respect to the manually operable handle portion.

8. A thrust-supported and thrust controlled device, comprising: a thrust-supportable object including a fuselage body member provided with three spaced outwardly projecting wing means symmetrically positioned around a longitudinal roll axis of the body member and provided with thrust-producing engine means, and positioning and control means effectively connected to said object at three locations on said wing means spaced around the longitudinal roll axis for positioning and retaining it in any desired stable thrust-supported elevated position and for controlling its position and its attitude with respect to a pitch axis, a yaw axis, and a roll axis perpendicular to one another, said positioning and control means including a manually operable handle portion at one end and tension and torque transmission means adapted to effectively apply position-correcting tension and effectively amplified torque to the object corresponding to and in response to relative movement of said manually operable handle portion and said object and including three flexible longitudinal solid tensile members and three effective torque amplifier means effectively connected between said tensile members and said wing means adapted to effectively apply said position-correcting tension and effectively amplified torque to the object.

9. A thrust-supported and thrust-controlled device of the character defined in claim 8, wherein each of said effective torque amplifier means comprises flap means pivotally mounted with respect to the corresponding wing means so as to normally lie in the same plane therewith for pivotal movement about a transverse axis substantially parallel to the pitch axis, and to the longitudinal direction of the wing means, and provided with an engaging element cooperable with a corresponding one of said flexible longitudinal tensile members for corrective pivotal actuation of said flap means in response to relative movement of the object around the longitudinal roll axis with respect to the manually operable handle portion.

10. A thrust-supported and thrust-controlled model airplane, comprising: a fuselage body member provided with a plurality of outwardly projecting wing means and thrust-producing engine means for supporting the fuselage body, each wing means having a leading edge provided with a connection member; a plurality of flexible longitudinal solid tensile members each having a remote connection end connected to a corresponding one of said connection members and each having a fastening end; control handle means provided with a plurality of fastening elements spaced in a manner corresponding to the spacing of the connection members carried by the wing members and fastened to the corresponding fastening ends of said flexible longitudinal tensile members; and an individual flap means pivotally mounted adjacent to and normally in line with each corresponding wing means and produced thrust from the engine means for pivotal movement about a longitudinal axis substantially parallel to and offset from a longitudinal axis of said corresponding wing means and being provided with an outwardly projecting engaging element offset from the pivotal mounting of the flap means with respect to the wing means and engaging the corresponding flexible longitudinal tensile member between the connection and the fastening ends thereof.

11. A thrust-supported and thrust-controlled model airplane, comprising: a fuselage body member provided with thrust-producing engine means and three symmetrically spaced outwardly projecting wing means located 120 degrees from one another around a longitudinal roll axis of the body member, each wing means having a leading edge provided with an outwardly directed projection member having at its outer end a connection member; three similar flexible longitudinal tensile members each having a remote connection end connected to a corresponding one of said connection members and each having a fastening end; control handle means provided with three fastening elements symmetrically circularly spaced 120 degrees apart around the center thereof and fastened to the corresponding fastening ends of the three flexible longitudinal tensile members; and an individual flap means pivotally mounted adjacent to and normally in line with each corresponding wing means for pivotal movement about a longitudinal axis substantially parallel to and offset from a longitudinal axis of said corresponding wing means and being provided with an outwardly projecting engaging element offset from the pivotal mounting of the flap means with respect to the wing means and engaging the corresponding flexible longitudinal tensile member between the connection and fastening ends thereof.

12. A thrust-supported and thrust-controlled model airplane, comprising: a fuselage body member provided with thrust-producing engine means and two symmetrically spaced outwardly projecting wing means located on opposite sides of and extending outwardly from said fuselage body member in a direction transverse to a longitudinal roll axis of said fuselage body member, each wing means having a leading edge provided with an outwardly directed projection member having at its outer end a connection member; said fuselage body member being provided with a third connection member positioned at a location transversely offset from said fuselage body member and offset from a line interconnecting the other two connection members; three similar flexible longitudinal tensile members each having a remote connection end connected to a corresponding one of said connection members and each having a fastening end; control handle means provided with three fastening elements spaced apart in a manner corresponding to the spacing of said three connection members and fastened to the corresponding fastening ends of the three flexible longitudinal tensile members; and an individual flap means pivotally mounted adjacent to and normally in line with each corresponding wing means for pivotal movement about a longitudinal axis substantially parallel to an offset from a longitudinal axis of said corresponding wing means and being provided with an outwardly projecting engaging element offset from the pivotal mounting of the flap means with respect to the wing means and engaging the corresponding flexible longitudinal tensile member between the connection and fastening ends thereof.

13. A thrust-supported and thrust-controlled model airplane, comprising: a fuselage body member provided with thrust-producing engine means and two symmetrically spaced outwardly projecting wing means located on opposite sides of and extending outwardly from said fuselage body member in a direction transverse to a longitudinal roll axis of said fuselage body member, each wing means having a leading edge provided with an outwardly directed projection member having at its outer end a connection member; said fuselage body member being provided with downwardly projecting landing gear means including a portion effectively comprising a third connection member positioned at a location transversely offset from the fuselage body member and offset from a line interconnecting the other two connection members; three similar flexible longitudinal tensile members each having a remote connection end connected to a corresponding one of said connection members and each having a fastening end; control handle means provided with three fastening elements spaced apart in a manner substantially identical to the spacing of said three connection members and fastened to the corresponding fastening ends of the three flexible longitudinal tensile members; and an individual flap means pivotally mounted adjacent to and normally in line with each corresponding wing means for pivotal movement about a longitudinal axis substantially parallel to and offset from a longitudinal axis of said corresponding wing means and being provided with an outwardly projecting engaging element offset from the pivotal mounting of the flap means with respect to the wing means and engaging the corresponding flexible longitudinal tensile member between the connection and fastening ends thereof.

14. A thrust-supported and thrust-controlled device comprising: a thrust-supportable object provided with thrust-producing engine means for solely supporting the object; airfoil means projecting outwardly with respect to an axis of and from the object; a handle spaced from the object; and a plurality of flexible means connected between the handle and the airfoil means in a direction substantially parallel to said axis to apply position-correcting tension and torque to the object corresponding to and in response to relative movement of the handle with respect to the object.

References Cited in the file of this patent

UNITED STATES PATENTS

| | | |
|---|---|---|
| 1,973,592 | Weisinger | Sept. 11, 1934 |
| 2,292,416 | Walker | Aug. 11, 1942 |
| 2,331,304 | Carmody | Oct. 12, 1943 |
| 2,472,075 | Hole | June 7, 1949 |

FOREIGN PATENTS

| | | |
|---|---|---|
| 671,393 | Great Britain | May 7, 1952 |